US012791134B2

(12) United States Patent
Rusconi et al.

(10) Patent No.: US 12,791,134 B2
(45) Date of Patent: Nov. 10, 2026

(54) MODULAR MULTI-CONNECTION DEVICE FOR HYDRAULIC AND ELECTRICAL LINES

(71) Applicant: Faster S.r.l., Rivolta d'Adda (IT)

(72) Inventors: Paolo Rusconi, Rivolta d'Adda (IT); Riccardo Arrigoni, Rivolta d'Adda (IT); Andrea Daniele, Reggio Nell'Emilia (IT)

( * ) Notice: Subject to any disclaimer, the term of this patent is extended or adjusted under 35 U.S.C. 154(b) by 330 days.

(21) Appl. No.: 18/688,509

(22) PCT Filed: Sep. 7, 2022

(86) PCT No.: PCT/IB2022/058406
§ 371 (c)(1),
(2) Date: Mar. 1, 2024

(87) PCT Pub. No.: WO2023/037257
PCT Pub. Date: Mar. 16, 2023

(65) Prior Publication Data

US 2024/0392905 A1 Nov. 28, 2024

(30) Foreign Application Priority Data

Sep. 10, 2021 (IT) ........................ 102021000023420

(51) Int. Cl.
*F16L 37/18* (2006.01)
*F16L 37/56* (2006.01)
(Continued)

(52) U.S. Cl.
CPC ............... *F16L 37/18* (2013.01); *F16L 37/56* (2013.01); *H01R 13/514* (2013.01);
(Continued)

(58) Field of Classification Search
CPC . F16L 37/18; F16L 37/56; F16L 25/01; F16L 37/12; H01R 13/514;
(Continued)

(56) References Cited

U.S. PATENT DOCUMENTS

2020/0049293 A1* 2/2020 Rambaldini ............ F16L 37/16

FOREIGN PATENT DOCUMENTS

EP 1950484 8/2010
EP 3569911 11/2019
(Continued)

OTHER PUBLICATIONS

Cejn Ab, Cejn Multi-X—Flexible multi connections for quick and easy handling (2012)—Submitted as third party observation in sister European application.

*Primary Examiner* — Justin M Kratt
(74) *Attorney, Agent, or Firm* — Themis Law

(57) ABSTRACT

A modular multi-connection device for the simultaneous connection of a plurality of hydraulic and electrical lines having a first fixed plate and a second movable plate, each supporting a plurality of male and female quick couplings, includes a first female connector assembly which houses one or more female electrical connectors, and a second male connector assembly which houses one or more corresponding male electrical connectors. The multi-connection device is modular and provides on each of the female and male connector assemblies a frame adapted to accommodate electrical connection modules all having the same fastening system to the frame and adapted to support an electrical connector, even of a different type.

9 Claims, 7 Drawing Sheets

(51) Int. Cl.

| | |
|---|---|
| ***H01R 13/514*** | (2006.01) |
| ***H01R 13/52*** | (2006.01) |
| ***H01R 13/62*** | (2006.01) |
| ***H01R 13/629*** | (2006.01) |
| *F16L 25/01* | (2006.01) |
| *F16L 37/12* | (2006.01) |
| *H01R 13/46* | (2006.01) |

(52) U.S. Cl.
CPC ......... *H01R 13/5219* (2013.01); *H01R 13/62* (2013.01); *H01R 13/62938* (2013.01); *F16L 25/01* (2013.01); *F16L 37/12* (2013.01); *H01R 13/46* (2013.01); *H01R 13/52* (2013.01); *H01R 13/5213* (2013.01); *H01R 13/629* (2013.01); *H01R 13/62905* (2013.01); *H01R 13/62922* (2013.01); *H01R 13/62927* (2013.01); *H01R 13/62933* (2013.01); *H01R 13/62955* (2013.01); *H01R 13/62966* (2013.01); *H01R 13/62972* (2013.01)

(58) Field of Classification Search
CPC ................ H01R 13/5219; H01R 13/62; H01R 13/62938; H01R 13/46; H01R 13/52; H01R 13/5213; H01R 13/629; H01R 13/62905; H01R 13/62922; H01R 13/62927; H01R 13/62933; H01R 13/62955; H01R 13/62966; H01R 13/62972
See application file for complete search history.

(56) References Cited

FOREIGN PATENT DOCUMENTS

| | | |
|---|---|---|
| IT | MI940559 | 9/1995 |
| JP | 2002252055 | 9/2002 |

* cited by examiner

MODULAR MULTI-CONNECTION DEVICE FOR HYDRAULIC AND ELECTRICAL LINES

FIELD OF THE INVENTION

The present invention concerns a modular multi-connection device for the connection of hydraulic and electrical lines, in particular for the connection of the lines of a machine, e.g. an agricultural machine, with a utility.

In particular, the multi-connection device according to the present invention allows both the oleodynamic connections and the electrical connections to be managed at the same time, in particular by being able to connect electrical lines with different power levels.

BACKGROUND

Multi-connection devices that allow the simultaneous connection of a plurality of hydraulic lines are known from the state of the art. The same Applicant holds numerous patent applications concerning multi-connection systems, such as the international patent application WO2021090201, and, among others, the European patents EP2476941, EP3009726 and EP 2884146.

Currently, the oleodynamic and electrical connections involved in the connection of an operating machine to a utility are managed separately, with separate connection devices.

The electrical connections generally have dedicated connectors (and separate from the others) for the different levels of electrical power of the lines since connectors dedicated to individual power levels, or to limited power ranges are available on the market at low cost.

Even in the case of the multi-connection plate solutions currently known developed by the same FASTER, they envisage the presence of a seat dedicated to an electrical connector (usually multi-pole), in order to connect the low-power utilities present on the tool, such as the rear warning lights and some low-power electrical utilities.

In some cases such multi-connection devices also comprise the electrical connector, which is mounted and wired in the multi-connection plates directly by the end customer, i.e. by the equipment manufacturer.

However, such devices of known type are not free from drawbacks.

In particular, the multi-connection devices of known type do not allow for the connection of a plurality of electrical lines having different power levels.

Furthermore, the multi-connection devices of known type do not have a modular structure, and therefore they are not versatile with respect to the different needs of the user who may need to provide one or more electrical connectors of different type on the multi-connection device.

Furthermore, even when the multi-connection devices of known type provide a seat for housing an electrical connector, they generally do not allow the simultaneous connection of a plurality of electrical lines at the same time and in the same manners as the hydraulic lines are connected.

This is perceived as an inconvenience by the user, who generally has to manually connect the electrical lines even when instead the device allows the simultaneous and automatic connection of a multiplicity of hydraulic lines.

SUMMARY OF THE INVENTION

In light of the above, the task of the present invention is to provide a multi-connection device for the simultaneous connection of hydraulic and electrical lines, in particular for the connection of the lines of a machine, for example an agricultural machine, with a utility, which allows the simultaneous connection of a plurality of hydraulic and electrical lines.

Within this task, aim of the present invention is to provide a multi-connection device that allows to connect electrical lines with different power levels.

Last but not least, aim of the present invention is to provide a modular multi-connection device, which allows a high degree of customization to the end user who can easily decide and vary the number and the type of electrical connectors to be installed on the device itself.

The task set out above, as well as the aforementioned aims and others that will become clearer later, are achieved by a multi-connection device for the simultaneous connection of hydraulic and electrical lines, according to the appended claim 1.

Other features of the multi-connection device according to the present invention are indicated in the dependent claims, which also form an integral part of the present disclosure.

LIST OF FIGURES

Further features and advantages will become clearer from the description of preferred, but not exclusive, embodiments, of a modular multi-connection device for the simultaneous connection of a plurality of hydraulic and electrical lines according to the present invention, illustrated by way of non-limiting example with the aid of the accompanying drawings in which.

DETAILED DESCRIPTION OF THE INVENTION

Figure 1:
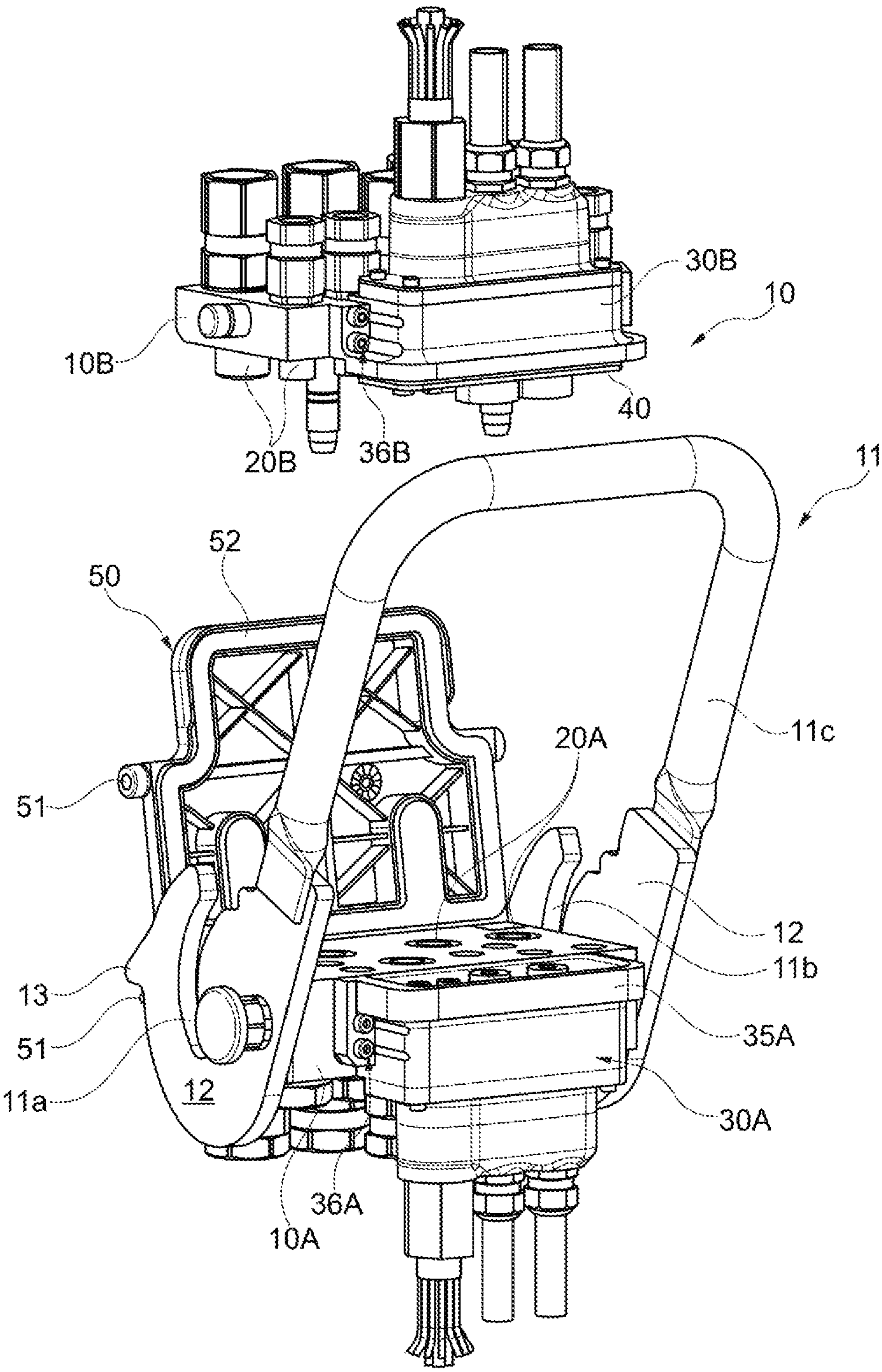
FIG. 1 shows an overall view of the multi-connection device according to the present invention in accordance with a first embodiment, in which the fixed plate and the movable plate are decoupled.

With particular reference to the appended figures, the modular multi-connection device 10 for the simultaneous connection of a plurality of hydraulic lines 20 for pressurized fluids and electrical lines 30 according to the present invention comprises a first fixed plate 10A, intended to be coupled to an operating machine, and a second movable plate 10B adapted to be associated with a utility.

A multiplicity of female cartridges 20A are inserted into said first fixed plate 10A, and a multiplicity of male couplings 20B are inserted into said second movable plate 10B.

Said fixed plate 10A is associated with a lever assembly 11 comprising a lever 11*c* and a pair of plate-like elements 12 each comprising a cam seat 11*a*, 11*b* adapted to accommodate a corresponding pin 11*d*, 11*e* integral with said second movable plate 10B in order to allow the coupling of the two plates and the connection of the male couplings 20B within the corresponding couplings, or more precisely female cartridge couplings 20A.

Integral with said first fixed plate 10A there is provided a first female connector assembly 30A which houses one or more female electrical connectors 31*a*, 32*a*, 33*a*, 34*a* and integral to said second movable plate 10*b*-10B there is provided a second male connector assembly 30B which houses one or more corresponding male electrical connectors 31*b*, 32*b*, 33*b*, 34*b*.

Said first female connector assembly 30A comprises in turn a first support element 35A which performs the dual clamping function to allow the connection of the first female connector assembly 30A to said first fixed plate 10*a*-10A of the multi-connection device 10 to which the connector assembly 30A is to be connected, and of sealing element towards the external environment.

Similarly, said second male connector assembly 30B will comprise a second support element 35B which performs the dual clamping function to allow the connection of the second male connector assembly 30B to said second movable plate 10B of the multi-connection device 10 to which the connector assembly 30B is to be connected, and of sealing element towards the external environment.

In particular, the sealing action between said first 35A and second 35B support element is ensured by the presence of a sealing element 40 adapted to seal against external environmental agents (water, dust, dirt in general) between said first female connector assembly 30A and said second male connector assembly 30B.

Preferably, said sealing element 40 is mounted on said second male support element 35B and is configured to exert the seal against said first female support element 35A. Preferably, said sealing element 40 is a gasket. Even more preferably said sealing element 40 is a lip seal.

The sealing element is designed to seal the connector assembly 30A. 30B given by the connection of said first 35A and second 35B support elements from the surrounding environment when it is connected and the lines are in operation.

In addition, the sealing element 40 and the sealing surfaces are advantageously made so as to guarantee the seal even during the mechanical deformation of the plates 10A. 10B (and therefore also of the connector) due to the application of hydraulic pressure.

Figure 2:
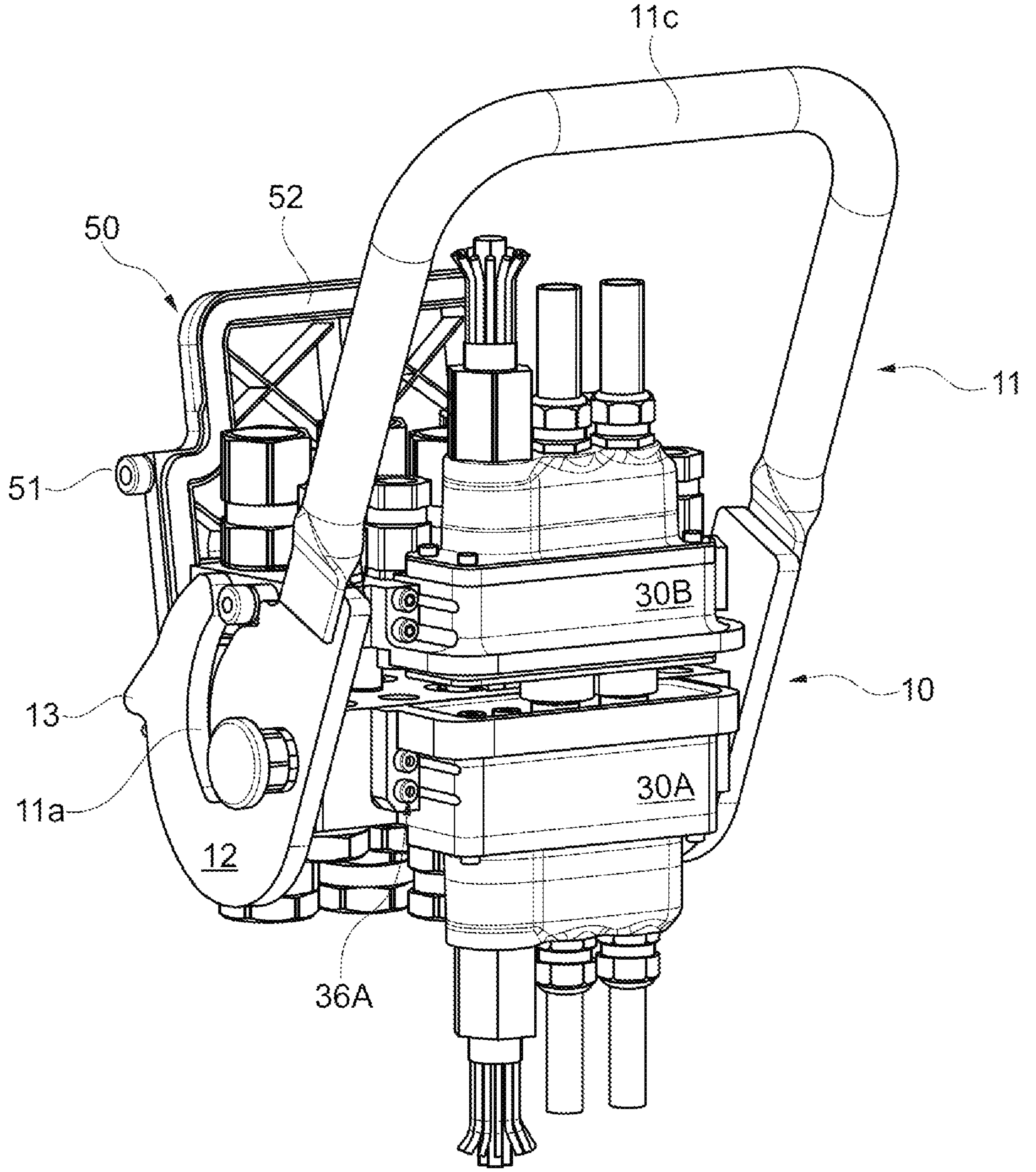
FIG. 2 shows the multi-connection device of FIG. 1 in an intermediate connection phase in which the plates, fixed and movable, are facing each other and about to be connected.
Figure 3:
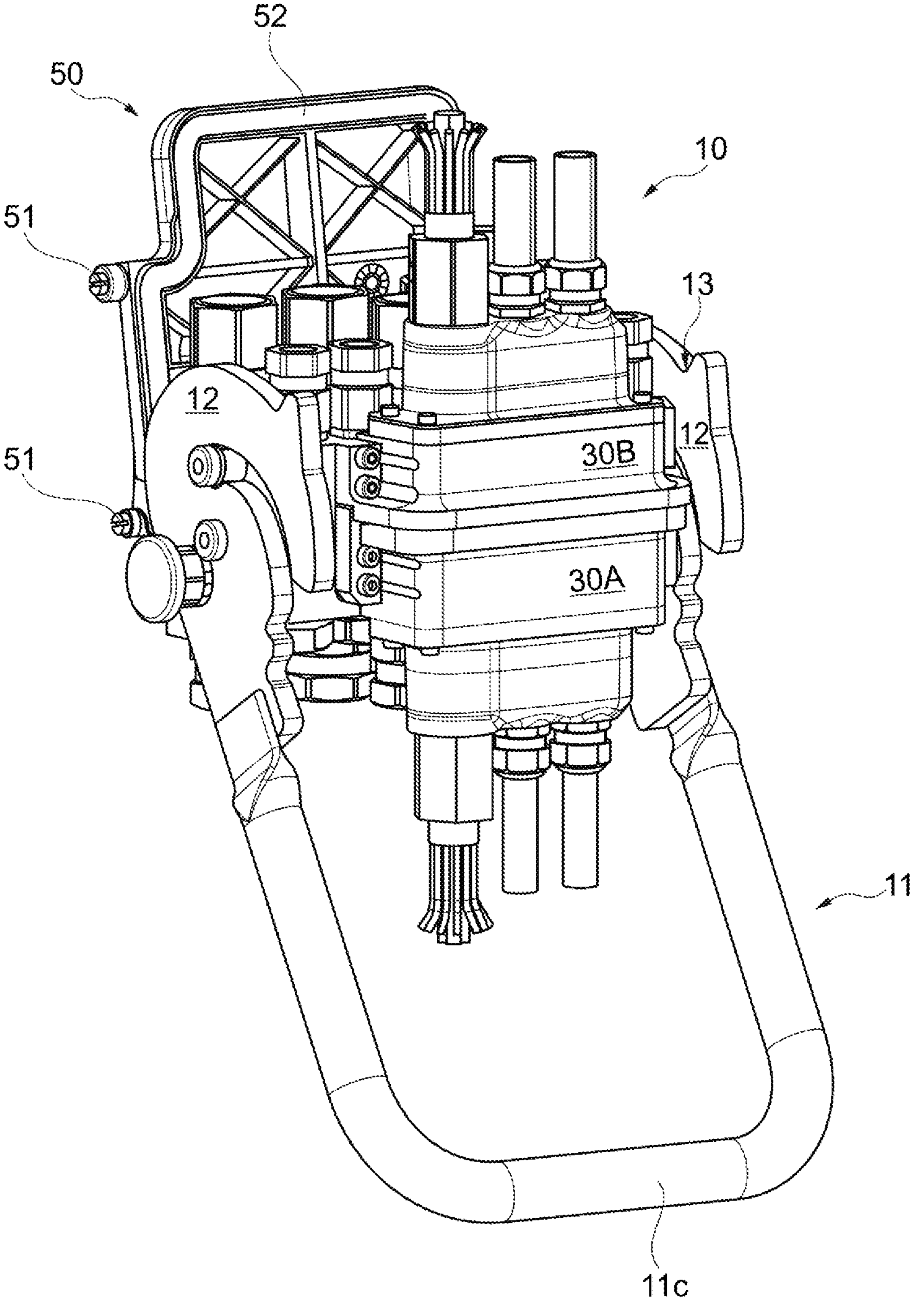
FIG. 3 shows the multi-connection device of FIG. 2 with completed connection, and the cam lever rotated in the connection closing position.
Figure 4A:
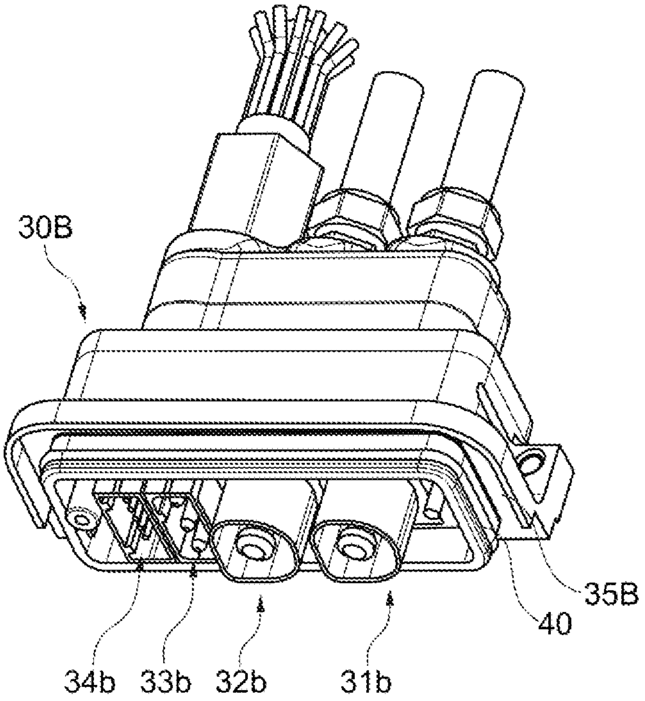
FIGS. 4A and 4B show perspective views of the male connector and the female connector for the connection of the electrical lines, respectively.
Figure 4B:
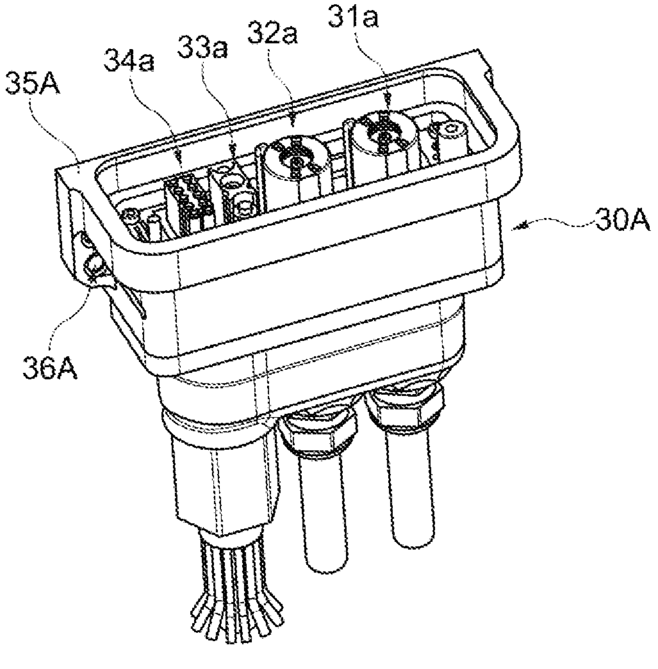

The support element 35A has coupling surfaces and fastening means 36A suitable for allowing the integral assembly with the relative fixed plate 10A in the case of a female connector assembly 30A. Said fastening means 36A advantageously comprise holes obtained on the flange of said support element 35A, visible for example in FIG. 4B, in which fastening screws, visible for example in FIGS. 1, 2 and 3, can be inserted.

Similarly, the support element 35B has coupling surfaces and fastening means 36B suitable for allowing the integral assembly with the relative movable plate 10B in the case of a male connector assembly 30B. Said fastening means 36B advantageously comprise holes obtained on the flange of said support element 35B in which fastening screws, visible for example in FIGS. 1, 2 and 3, can be inserted.

Each of said female 30A and male 30B connector assemblies further comprises a first frame 37A and, respectively, a second frame 37B, advantageously comprising each one or more fastening elements suitable for allowing the assembly of modules 31, 32, 33, 34 each supporting an electrical connector respectively female 31*a*, 32*a*, 33*a*, 34*a* or male 31*b*, 32*b*, 33*b*, 34*b*.

Advantageously, said fastening elements are standardized so as to allow inserting into said frame 37A, 37B different types of modules 31, 32, 33, 34 for as many types of electrical connectors.

The frame 37A, 37B is fastened inside the connector assembly (female 30A and male 30B) and acts as an anchor for the modules 31, 32, 33, 34.

Figure 5:
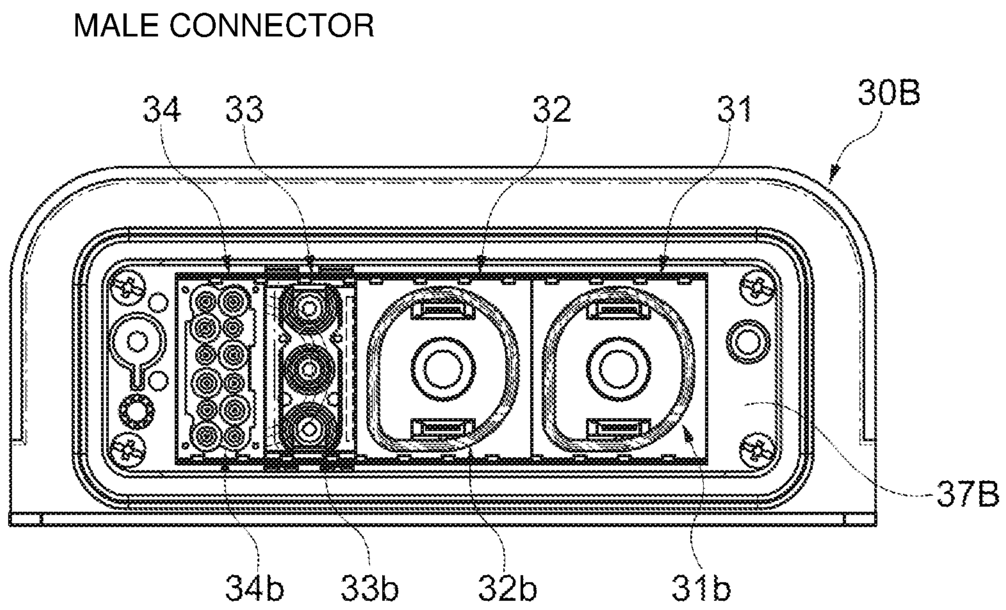
FIG. 5 shows a plan view of the male connector from above.
Figure 6:
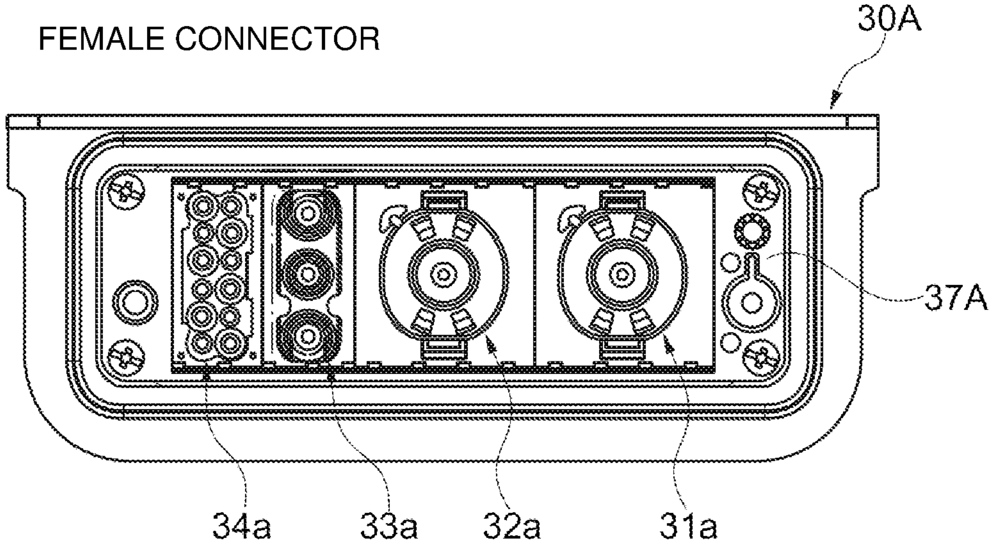
FIG. 6 shows a plan view of the female connector from above.
Figure 7:
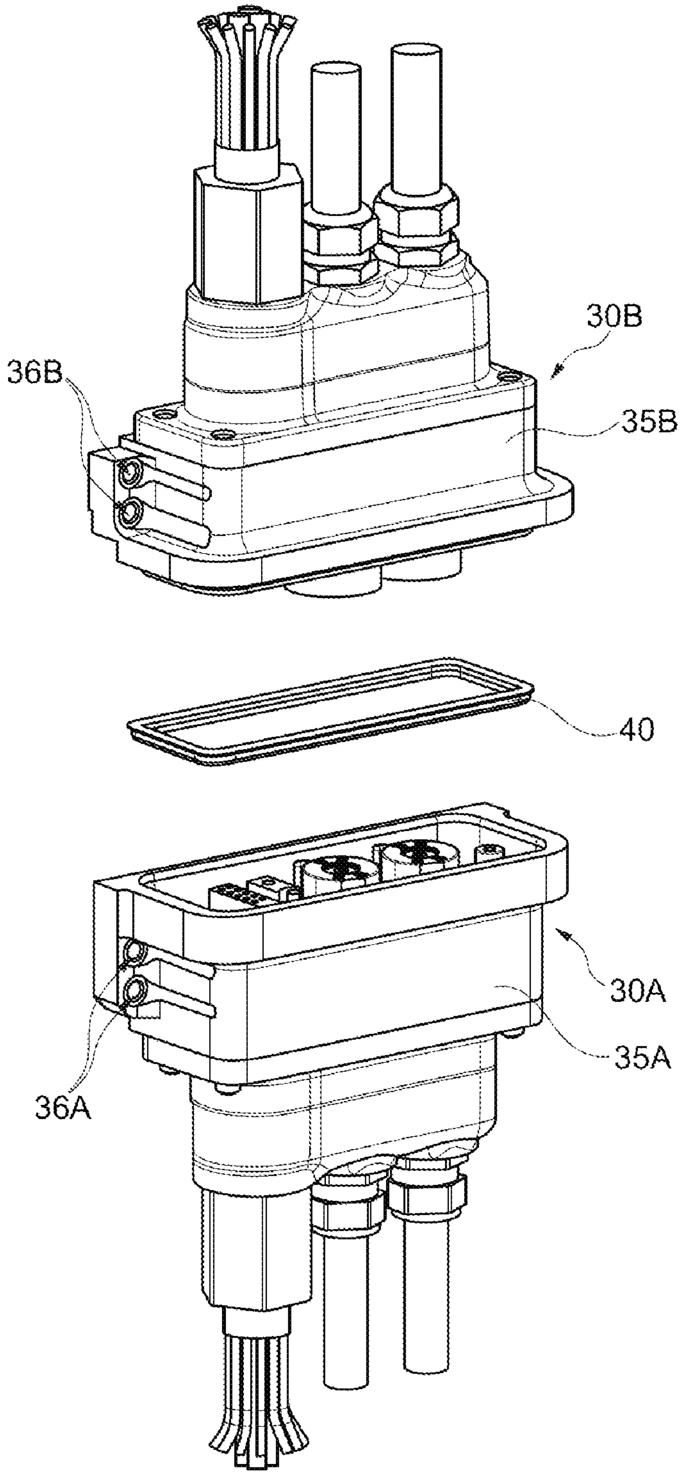
FIG. 7 shows a partially exploded perspective view of the male and female connectors spaced apart from each other and of the lip seal adapted to be fitted on the support of the male connector.
Figure 8:
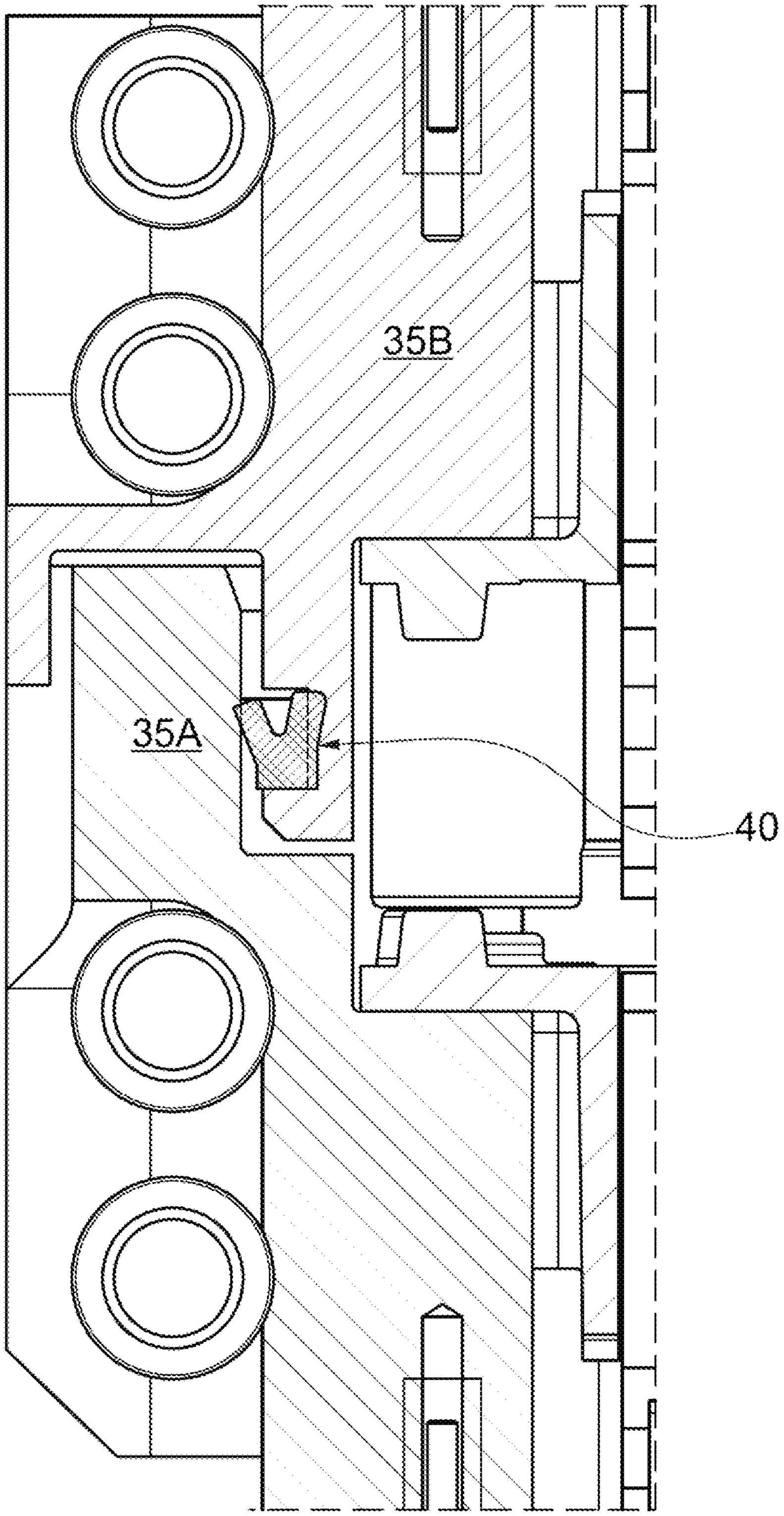
FIG. 8 shows a cross-sectional view where the male and female connectors have been connected, in which the positioning of the lip seal can be seen.

By way of example only, FIGS. 5 and 6 show, inserted in the respective frames 37A and 37B, a pair of high-power female 31*a*, 31*b* and male 32*a*, 32*b* connectors, a medium-power female 33*a* and male 33*b* connector, and a low-power female 34*a* and male 34*b* connector.

As can be seen, the electrical connectors are coupled to the frame by means of modules 31, 32, 33, 34 connected to the frame interchangeably, advantageously also on specific design of the connector manufacturer, in order to allow the assembly of different types of modules and, therefore, of electrical connectors to the frames of the female 30A and male 30B connector assemblies.

The multi-connection device 10 according to the present invention is therefore modular in that it provides on said female 30A and male 30B connector assemblies for frames 37A, 37B adapted to accommodate electrical connection modules 31, 32, 33, 34 all having the same fastening system to the frame. The modules 31, 32, 33, 34 can therefore support the same type of electrical connector, like in the case of the example shown in the accompanying figures which comprises two high-power electrical connectors 31*a*, 31*b*, 32*a*, 32*b*, or of a different type, like in the case of the other electrical connectors 33*a*, 33*b*, 34*a*, 34*b* shown in the example, being able to replace the modules supporting the connectors with extreme ease.

In order to ensure the modularity of the system, the frames 37A, 37B of the modular connector assemblies 30A, 30B according to the present invention are advantageously made in different formats, and can contain a variable number of modules 31, 32, 33, 34, depending on the dimension chosen for the frame.

Furthermore, as described, the modules within the frame are interchangeable, so that any configuration of the modules within the frame can be chosen, ensuring a high versatility of the system.

As a purely by way of non-limiting example, the figures illustrate the most complete modular connector possible, that is, having the maximum dimension of the frame with respect to the dimensions of the male 35B and female 35A support elements, so as to be able to contain the maximum variety of modules.

Furthermore, the following modules are illustrated in the exemplary figures that accompany and form an integral part of the present disclosure, in view of the typical applications to which the multi-connection device 10 according to the present invention can be dedicated:

- high-power connector modules (typically 1,000 V, 325 A maximum) 31*a*, 31*b*, 32*a*, 32*b* with 2 poles: typically used for electrical connection between batteries and inverters for electric traction, or high-power electrical utilities;

medium-power connector modules (typically 400 V, 38 A maximum) 33*a*, 33*b* with 3 poles: typically used for medium-power utilities (three-phase motors, other);

low-power connector modules (typically 250 V, 20 A maximum) 34*a*, 34*b* with 12 poles: typically used for low-power utilities (headlights, servo controls).

By way of example, it should be noted that in the figures illustrating one of the possible embodiments of the connector module according to the present invention only some, in particular three, of the multiple possible electrical lines that can be provided on board the multi-connection device according to the invention are shown. In fact, again by way of example, a signal connection module (e.g. 8-pole, 50 V, 10 A max.), typically used for signal connections (CAN BUS, Ethernet, serial), can be provided.

It has thus been shown that the modular multi-connection device 10 for the simultaneous connection of a multiplicity of hydraulic and electrical lines according to the present invention makes it possible to fulfil the task and achieve the purposes that the invention had set itself.

In particular, it has been illustrated how the hydraulic/electrical multi-connection device 10 according to the invention comprises a hydraulic multi-connection assembly, consisting of a fixed plate 10A, on which the female hydraulic cartridges 20A are installed, and a movable plate 10B, on which all the male hydraulic cartridges 20B are installed. The hydraulic oil passage tubes, coming from the machine (for cartridges 20A on the fixed plate 10A) and from the tool (for cartridges 20B on the movable plate 10B) will be connected to each of these cartridges.

A corresponding connector assembly respectively female 30A and male 30B are associated with each plate 10A, 10B. These connector assemblies, of modular type as they allow different types of modules to be installed within the same support frame 37A, 37B, are each integral with the respective plate 10A, 10B, so that the connection action will take place in the same way as the hydraulic plates, that is, through the actuation of the lever assembly 11.

The connector assembly is therefore composable with different types of electrical connections (high, medium, low power), all interchangeable with each other at the discretion of the customer and of the electrical application to be served.

To facilitate the interface between the connector and the plates, mechanical machinings of flattening and threaded drilling are provided to minimise the chain of tolerances that could affect the correct coupling of the connector.

Preferably, in order to ensure the environmental seal of the fixed plate 10A with the relative female connector assembly 30A under conditions not connected with the movable plate 10B and with the relative male connector assembly 30B, an automatic cover or cap 50 with forced closure as a result of the actuation of the lever assembly 11 is advantageously provided.

As can be seen in the accompanying figures, the cover 50 comprises guide rollers 51 adapted to interact with the plate-like portions 12 of the lever assembly 11, on the external profile of said plate-like portions 12 there being provided a shaped profile 13 adapted to abut said guide rollers 51 thereby moving the cover 50 into opening/closing when said lever assembly 11 is moved.

Advantageously, said cover 50 comprises, along the perimeter of its lower face, a gasket 52, preferably a compression gasket, which lever 11 closed is loaded making the seal against the surface of the fixed plate 10A and of the edge of the first support element 35A of the relative connector assembly 30A.

With plates 10A, 10B and connector assemblies 30A, 30B connected, on the other hand, the seal with respect to the outside of the connector assemblies is ensured by the lip seal 40.

The present invention has been described, by way of non-limiting example, according to preferred embodiments, but it is to be understood that changes and/or modifications may be made by the person skilled in the art, without departing from the relative scope of protection, as defined in the appended claims.

The invention claimed is:

1. A modular multi-connection device (10) for a simultaneous connection of a plurality of hydraulic (20) and electrical (30) lines comprising a first fixed plate (10A) and a second movable plate (10B), each supporting a plurality of quick couplings respectively female (20A) and male (20B), and a lever assembly (11) for coupling said plates (10A, 10B) and a simultaneous connection of said lines (20, 30), comprising:

integrally connected to said first fixed plate (10A), a first female connector assembly (30A) which houses one or more female electrical connectors (31*a*, 32*a*, 33*a*, 34*a*), said first female connector assembly (30A) comprising a first support element (35A) adapted to allow a connection of said first female connector assembly (30A) to said first fixed plate (10A), said first support element (35A) housing a first frame (37A) comprising one or more fastening elements configured for allowing an assembly of modules (31, 32, 33, 34), each supporting a female electrical connector (31*a*, 32*a*, 33*a*, 34*a*); and integrally connected to said second movable plate (10B), a second male connector assembly (30B) which houses one or more corresponding male electrical connectors (31*b*, 32*b*, 33*b*, 34*b*), said second male connector assembly (30B) comprising a second support element (35B) adapted to allow a connection of said second male connector assembly (30B) to said movable plate (10B), said second support element (35B) housing a second frame (37B) comprising one or more fastening elements configured for allowing an assembly of said modules (31, 32, 33, 34), each supporting a male electrical connector (31*b*, 32*b*, 33*b*, 34*b*).

2. The modular multi-connection device (10) according to claim 1, wherein said modules (31, 32, 33, 34), each supporting an electrical connector, are interchangeable so that a user can associate with said frames (37A, 37B) of said first and said second connector assemblies (30A, 30B) different types of electrical connectors.

3. The modular multi-connection device (10) according to claim 1, wherein said electrical connectors supported by said frames (37A, 37B) of said first and said second connector assembly (30A, 30B) comprise two high-power electrical connectors (31*a*, 31*b*, 32*a*, 32*b*) with two poles, a medium-power connector (33*a*, 33*b*) with three poles, and a low-power connector (34*a*, 34*b*) with twelve poles.

4. The modular multi-connection device (10) according to claim 1, further comprising, interposed between said first (35A) and said second (35B) support element, at least one sealing element (40) adapted to make a seal against air, water and dust with the modular multi-connection device (10).

5. The modular multi-connection device (10) according to claim 4, wherein said sealing element comprises a lip seal and is associated with said second support element (35B).

6. The modular multi-connection device (10) according to claim 1, further comprising, associated with said fixed plate (10A), a lever assembly (11) comprising a lever (11*c*) and a pair of planar elements (12) each comprising a cam seat (11*a*, 11*b*) configured to accommodate a corresponding pin (11*d*, 11*e*) integral with said second movable plate (10B) so as to allow a mutual coupling of the first fixed plate and the second movable plate and a connection of the quick male couplings (20B) within corresponding quick female couplings (20A).

7. The modular multi-connection device (10) according to claim 6, wherein the mutual coupling of the first fixed plate and the second movable plate (10A, 10B) by a movement of said lever (11*c*) causes a simultaneous connection of the quick male couplings (20B) within the corresponding quick female cartridge-couplings (20A) and a connection of the electrical lines (30) by coupling the electrical male connectors (31*b*, 32*b*, 33*b*, 34*b*) within the corresponding female electrical connectors (31*a*, 32*a*, 33*a*, 34*a*) of said first and said second male and female connector assembly (30A, 30B).

8. The modular multi-connection device (10) according to claim 6, associated with said first fixed plate (10A), a cover (50) with forced closure as a result of an actuation of said lever assembly (11) configured to provide a coverage of the fixed plate (10A) and of a relative first female connector assembly (30A) when said fixed plate and said conditions not connected with the second movable plate (10B) and with a relative second male connector assembly (30B).

9. The modular multi-connection device (10) according to claim 8, wherein said cover (50) comprises, along a perimeter of its a lower face of said cover, a gasket (52), and wherein said lever (11) in a coupling position is loaded by compression, making the seal against a surface of the first fixed plate (10A) and an the edge of said first support element (35A) of said first female connector assembly (30A).

* * * * *